June 22, 1943.    H. C. HARRISON    2,322,292
BEARING STRUCTURE FOR RELAYS AND THE LIKE
Filed July 17, 1941

INVENTOR
H.C. HARRISON
BY
P. C. Smith
ATTORNEY

Patented June 22, 1943

2,322,292

UNITED STATES PATENT OFFICE 2,322,292

BEARING STRUCTURE FOR RELAYS AND THE LIKE

Henry C. Harrison, Port Washington, N. Y., assignor to Bell Telephone Laboratories, Incorporated, New York, N. Y., a corporation of New York Application July 17, 1941, Serial No. 402,785

13 Claims. (Cl. 308—26)

This invention relates to a bearing structure particularly applicable to relays, ringers and similar apparatus having oscillatable armatures or members.

It is the object of the invention to improve bearing structures of the type particularly applicable to relays and ringers whereby the friction inherent in the armature pivots hereinbefore used therein is materially reduced.

In accordance with the present invention, to constitute each bearing, the shaft to be oscillatably supported is provided with three or more axially extending grooves in its surface in which the ends of a corresponding number of radially extending spring fingers are seated. The spring fingers may be formed integrally with a bearing plate positioned in a plane at right angles to the axis of the shaft and through a central opening in which the shaft extends or the fingers may be formed individually and secured to a suitable support. If the spring fingers are formed integrally with the bearing plate, they are stamped from the body of the plate, severed therefrom throughout the major portion of their length and bent at their points of union with the plate at right angles to the plane of the plate. The torsional surface stiffness of the fingers thus formed is quite small but they have considerable stiffness in a direction at right angles to the plate from which they are stamped and thus have a small resistance component in the direction of the shaft rotation. The shaft is thus firmly supported but is capable of rotating or oscillating quite freely through the required rotational arc.

The invention will be more clearly understood by reference to the following detailed description taken in connection with the accompanying drawing in which several embodiments of the invention have been illustrated and which may be used in connection with a relay such as that shown in application Serial No. 354,684, filed August 29, 1940, issued March 3, 1942, as Patent No. 2,275,145, of which the present application is a continuation-in-part. In the drawing.

Figure 1:
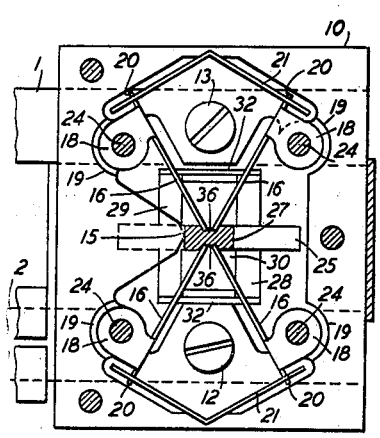
Fig. 1 is a top plan view of a bearing plate particularly disclosing the spring fingers by which the rotor support yoke of a relay is supported for swinging movement.

Referring first to Figs. 1 to 4, inclusive, the invention has been illustrated as applied to a polarized relay of the type disclosed in my above-identified patent, the ends of the core arms being illustrated at 1 and 2. The forward ends of the core arms 1 and 2 are inter-connected by two box-shaped spacers 10 and 11 formed as diecastings from non-magnetic material. The spacers are positioned one with its bottom engaged against the upper surfaces of the core arms 1 and 2 and the other with its bottom engaged against the under surfaces of the core arms and are secured to the core arms by bolts 12 and 13 which extend through holes in such spacers and in the ends of the core arms and into threaded nuts 14. The bottom of each spacer, as best disclosed in Fig. 1, is provided with a central opening therein through which a spindle of a rotor supporting yoke may extend, the edge of the opening towards the rear end of the relay having a tongue 15 provided with a fulcrum edge against which an edge of a spindle of a rotor yoke rests when the rotor is assembled in the spacers.

Positioned within each spacer are four spring fingers 16 which extend radially toward the center of the spacer. Each spring finger is mounted edgewise in the spacer, is provided with an offset portion 17 to increase its lateral and edgewise flexibility and is formed near its outer end with an ear 18 bent at right angles to the plane of the finger which rests on a recessed shoulder 19 formed in the inside corner of the spacer. Each shoulder 19 is recessed below the outer surface of the spacer substantially the thickness of the ear 18 of the finger supported thereon. The outer end of each finger is provided with a lug 20 which is engaged in a hole in the end of a spring 21. As best disclosed in Fig. 1, two springs 21 are provided each bent into a wide V-shape with its central portion engaged in a V-shaped notch in a side wall of the spacer and its ends engaged with the lugs 20 on the ends of two of the spring fingers 16. The springs 21 serve to force the inner ends of the spring fingers inwardly toward the center of the spacer.

Figure 4:
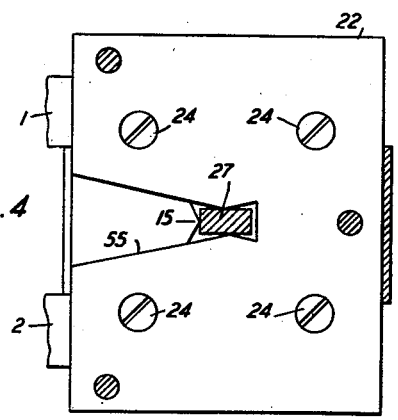
Fig. 4 is a top plan view of one of the cover plates in its assembled position.

For holding the spring fingers 16 and springs 21 in their assembled positions disclosed in Figs. 1 and 2, cover plates 22 and 23 are provided for the spacers 10 and 11, respectively. Each cover plate as best disclosed in Fig. 4 is provided with a slot 55 for permitting a spindle extension to extend therethrough. Each cover plate is secured to the associated spacer by screws 24 which extend through holes in such cover plate, through holes in the ears 18 of the spring fingers 16 and into tapped holes in the shoulders 19 of the spacer. The sides of the slot 55 are so shaped adjacent to the spindle extension as to permit the extension to rotate to a limited extent around its axis, but to be restrained against lateral movement. The spindle extension is also embraced between the end of the tongue 15 and the end of the slot 55 to restrain the movement of the spindle extension in its own plane.

Figure 2:
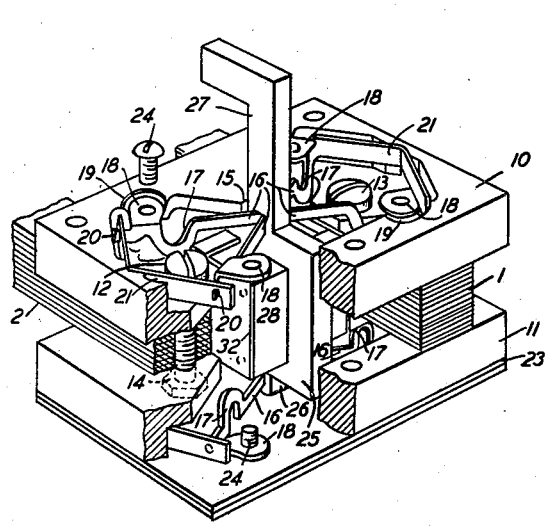
Fig. 2 is a perspective view, partly in cross section, of a rotor, rotor supporting yoke and supporting spring finger assembly.

Supported within the openings through the bottom of the spacers 10 and 11 on the inner ends of the spring fingers 16 is a rotor, best disclosed in Fig. 2. This rotor comprises a square yoke frame 25 of non-magnetic material having axially aligned spindle extensions 26 and 27. Supported within the yoke are two permalloy pole-pieces 28 and 29 and an interposed permanent bar magnet 30. Two thin nickel-silver plates 32 are spot welded to the ends of the pole-pieces 28 and 29. Each spindle extension 26 and 27 of the yoke 25 is provided with grooves 36 oppositely disposed in the faces thereof, the bottoms of which grooves have cylindrical surfaces as best disclosed in Fig. 3. When the rotor is assembled within the spacers 10 and 11, the inner ends of the spring fingers 16 supported by the upper spacer 10 are seated against the cylindrical bottom surfaces of the grooves 36 in the upper spindle extension 27 of the yoke and the inner ends of the spring fingers 16 supported by the lower spacer 11 are seated against the cylindrical bottom surfaces of the grooves 36 in the lower spindle extension 26. The cover plates 22 and 23 are then slid into place over the outer faces of the spacers 10 and 11 and then secured to the spacers in the manner previously described, as by the screws 24.

The rotor when energized by flux flowing therethrough across the ends of the pole arms 1 and 2 tends to turn either in a clockwise or a counterclockwise direction depending upon the direction in which such flux flows and is supported for turning movement by the ends of the spring fingers 16 which flex to permit the rotor to turn freely through a small rotational arc.

Figure 5:
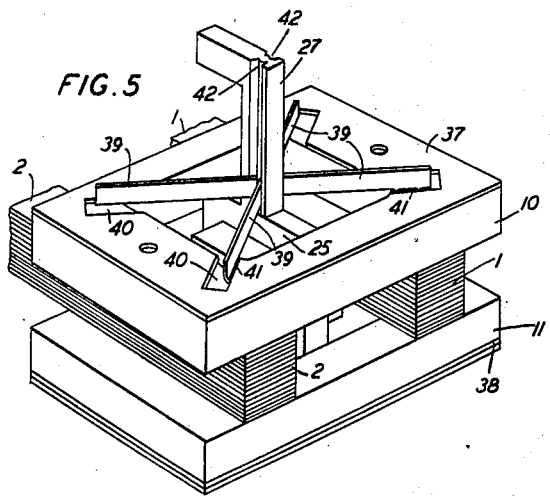
Fig. 5 is a perspective view of a further embodiment of a spring finger assembly.
Figure 3:
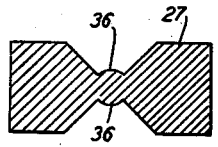
Fig. 3 is an enlarged cross-sectional view of a spindle or shaft showing the grooves in which the ends of the spring fingers may be seated.

Instead of the separate spring fingers 16 disclosed in Figs. 1 and 2, the spring fingers may be formed integrally with the plates 37 and 38 as disclosed in Fig. 5. Such plates may be secured to the outer faces of the spacers 10 and 11 by the same bolts 12 and 13 which secure the spacers to the ends of the pole arms 1 and 2 or the plates may be secured to the spacers by separate screws as the screws 24 shown in Figs. 1 and 2. In forming the bearing plate 37, substantially triangular portions are stamped out of the plate leaving a rectangular frame and four fingers 39 extending radially from the inner corners of such frame and the corners of the frame are also cut as indicated at 40 so that the fingers 39 are severed from the frame throughout their length except at the points 41. The inner ends of the fingers are also cut off and the fingers are bent at the point 41 into planes at right angles to the plane of the plate 37. The spindle extensions 26 and 37 of the rotor yoke 25 are provided with grooves 42 in which the inner ends of the fingers 39 are seated in the assembly of the rotor within the spacers 10 and 11.

Figure 6:
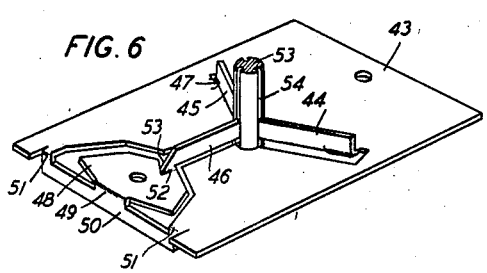
Fig. 6 is a perspective view of a further embodiment of a spring finger assembly.

In Fig. 6 a further modified form of bearing plate 43 having three fingers 44, 45, 46 formed integrally therewith is illustrated. The fingers 44 and 45 are struck out of the plate 43, are severed therefrom except at the points 47 near their outer ends and are bent into planes at right angles to the plane of the plate. The third finger 46 is stamped from plate 43 with a widened base portion 48, the outer end of which is joined at 49 to the narrow member 50 forming one end of the plate. The member 50 is bent at right angles to the plate 43 at the points 49 and 51 and the finger 46 is bent into a plane at right angles to the plane of the plate 43 at the point 52, the outer end of the finger being cut at 53 for this purpose. The three fingers thus stamped from the plate 43 and bent as previously described are disposed in planes 120 degrees apart. The spindle or shaft 53 which is to be rotatably supported is provided with three grooves 54 extending axially in its surface, in which grooves the inner ends of the fingers 44, 45 and 46 are seated. Since the member 50 to which the base portion 48 of finger 46 is integrally joined, has resiliency between the points 51 where its ends are joined to the plate 43 in the direction toward and away from the shaft 53, the finger 46 may be moved toward or away from the shaft in assembling the shaft with respect to the bearing plate 43 until the best operating position thereof is secured and the shaft 53 is firmly supported on the ends of the three fingers 44, 45 and 46 with the greatest freedom of rotational movement. The finger 46 is then held in its adjusted position by the bolts 12 and 13 which clamp the plate 43 to the associated spacer such as spacer 10.

While I have illustrated my invention by a few selected embodiments and have described the invention as particularly applicable to relays and ringers, it is to be understood that the invention might be illustrated by further embodiments and is applicable to other types of apparatus in which the movable member requires only a limited rotational or oscillatory movement and, therefore, the scope of the invention should be considered as limited only by the appended claims.

What is claimed is:

1. In combination, a shaft having a plurality of longitudinally extending grooves in its surface and a bearing support therefor comprising a member disposed at right angles to the axis of said shaft having a centrally disposed opening therein through which said shaft extends and having a plurality of spring fingers radially extending therefrom toward said shaft with their converging ends seated in the grooves of said shaft.

2. In combination, a shaft having a plurality of longitudinally extending grooves in its surface near each end thereof, and a bearing support for each end of said shaft comprising a member disposed at right angles to the axis of said shaft having a centrally disposed opening therein through which said shaft extends and having a plurality of spring fingers extending radially therefrom towards said shaft with their converging ends seated in the grooves of said shaft.

3. In combination, a shaft having a plurality of longitudinally extending grooves in its surface near each end thereof and a bearing support for each end of said shaft comprising a box-shaped member disposed at right angles to the axis of said shaft having a centrally disposed opening in its bottom wall through which said shaft extends and having a spring finger secured to each of its inside corners and extending radially toward said shaft with its free end seated in a groove of said shaft.

4. In combination, a shaft having a plurality of longitudinally extending grooves in its surface near each end thereof and a bearing support for each end of said shaft comprising a box-shaped member disposed at right angles to the axis of said shaft having a centrally disposed opening in its bottom wall through which said shaft extends and having a shoulder portion in each of its inside corners, and spring fingers disposed in radial planes coincident with the axis of said shaft with their convergent ends seated in the grooves of said shaft and each having an ear bent at right angles therefrom near its outer end by which it is secured to a shoulder portion of said member.

5. In combination, a shaft having a plurality of longitudinally extending grooves in its surface near each end thereof and a bearing support for each end of said shaft comprising a box-shaped member disposed at right angles to the axis of said shaft having a centrally disposed opening in its bottom wall through which said shaft extends and having a shoulder portion in each of its inside corners, spring fingers disposed in radial planes coincident with the axis of said shaft with their converging ends seated in the grooves of said shaft, each of said springs having an ear bent at right angles therefrom near its outer ends whereby it is supported on a shoulder portion of said member, a cover plate for said member and screws extending through holes therein and through holes in the ears of said springs into threaded holes in said shoulder portions whereby said springs are secured to said member.

6. In combination, a shaft having a plurality of longitudinally extending grooves in its surface near each end thereof and a bearing support for each end of said shaft comprising a box-shaped member disposed at right angles to the axis of said shaft having a centrally disposed opening in its bottom wall through which said shaft extends and having a shoulder portion in each of its inside corners, spring fingers disposed in radial planes coincident with the axis of said shaft with their convergent ends seated in the grooves of said shaft, each of said springs having an ear bent at right angles therefrom near its outer end whereby it is pivotally supported on a shoulder portion of said member, springs supported in the ends of said member with their free ends in engagement with the outer ends of said spring fingers for normally moving the other ends of said fingers towards said shaft, a cover plate for said member and screws extending through holes therein and through holes in the ears of said springs into threaded holes in said shoulder portions whereby said springs are secured to said member.

7. In combination, a shaft having a plurality of longitudinally extending grooves in its surface near each end thereof and a bearing support for each end of said shaft comprising a box-shaped member disposed at right angles to the axis of said shaft and having a centrally disposed opening in its bottom wall through which said shaft extends, said opening being so conformed as to provide a tongue engageable with one portion of the surface of said shaft, spring fingers secured within said member and extending radially toward said shaft with their converging ends seated in the grooves of said shaft, and a cover for said member secured thereto and having a slot therein, the sides and end of which slot being so conformed as to engage the surfaces of said shaft and with the tongue of said member to restrain said shaft from lateral vibratory movement while permitting its rotary movement around its own axis.

8. In combination, a flat shaft having oppositely disposed longitudinally extending grooves in its faces near each end thereof, the bottom of each of said grooves having a cylindrical surface the axis of generation of which is coincident with the axis of said shaft and a bearing support for each end of said shaft comprising a box-shaped member disposed at right angles to the axis of said shaft having a centrally disposed opening in its bottom wall through which said shaft extends and spring fingers disposed in radial planes coincident with the axis of said shaft within said member with their convergent ends seated against the cylindrical bottom surfaces of said grooves.

9. In combination, a flat shaft having oppositely disposed longitudinally extending grooves in its faces near each end thereof, the bottom of each of said grooves having a cylindrical surface the axis of generation of which is coincident with the axis of said shaft and a bearing support for each end of said shaft comprising a box-shaped member disposed at right angles to the axis of said shaft and having a centrally disposed opening in its bottom wall through which said shaft extends, said opening being so conformed as to provide a fulcrum tongue engageable with one edge of said shaft, spring fingers secured within said member and extending radially toward said shaft with their convergent ends seated against the cylindrical bottom surfaces of said grooves and a cover for said member secured thereto and having a slot therein, the sides and end of said slot being so conformed as to engage the side faces and one edge of said shaft and with the tongue of said member to restrain said shaft from lateral vibratory movement while permitting a restricted rotary movement around its own axis.

10. In combination, a shaft having a plurality of longitudinally extending grooves in its surface and a bearing support therefor comprising a plate disposed at right angles to the axis of said shaft having a centrally disposed opening therein through which said shaft extends and having a plurality of spring fingers struck up therefrom extending inwardly with their free ends seated in the grooves of said shaft.

11. In combination, a shaft having a plurality of longitudinally extending grooves in its surface and a bearing support therefor comprising a plate disposed at right angles to the axis of said shaft having a centrally disposed opening therein through which said shaft extends and having a plurality of spring fingers struck out of said plate, severed therefrom throughout the major portion of their length and bent at their points of union with said plate into planes at right angles to said plate, said fingers extending inwardly with their free ends seated in the grooves of said shaft.

12. In combination, a shaft having a plurality of longitudinally extending grooves in its surface and a bearing support therefor comprising a plate disposed at right angles to the axis of said shaft having a centrally disposed opening therein through which said shaft extends and having triangularly shaped portions cut out therefrom to form an outer frame and spring fingers extending radially inwardly from the inside corners of said frame, said spring fingers being bent at their points of union with said plate into planes extending at right angles to said plate and having their free ends seated in the grooves of said shaft.

13. In combination, a shaft having a plurality of longitudinally extending grooves in its surface and a bearing support therefor comprising a plate disposed at right angles to the axis of said shaft having a centrally disposed opening therein through which said shaft extends and having three symmetrically disposed spring fingers struck out of said plate and severed therefrom throughout the major portion of their length, two of said fingers being bent at their points of union with said plate into planes at right angles to said plate and the third of said fingers being a substantially T-shaped member the stem of which is bent at right angles to the plane of said plate and the head of which is bent at its point of union with its stem and at the points of union of its ends with said plate into a plane at right angles to said plate to form a resilient support for said spring finger whereby the free end of said finger is adjustably movable toward and away from said shaft, said fingers extending inwardly with their free ends seated in the grooves of said shaft.

HENRY C. HARRISON.